Dec. 12, 1967 C. D. FISHER 3,357,840
DRY CONFECTION MIXES AND PROCESSES FOR PRODUCING SAME
Filed Dec. 9, 1963
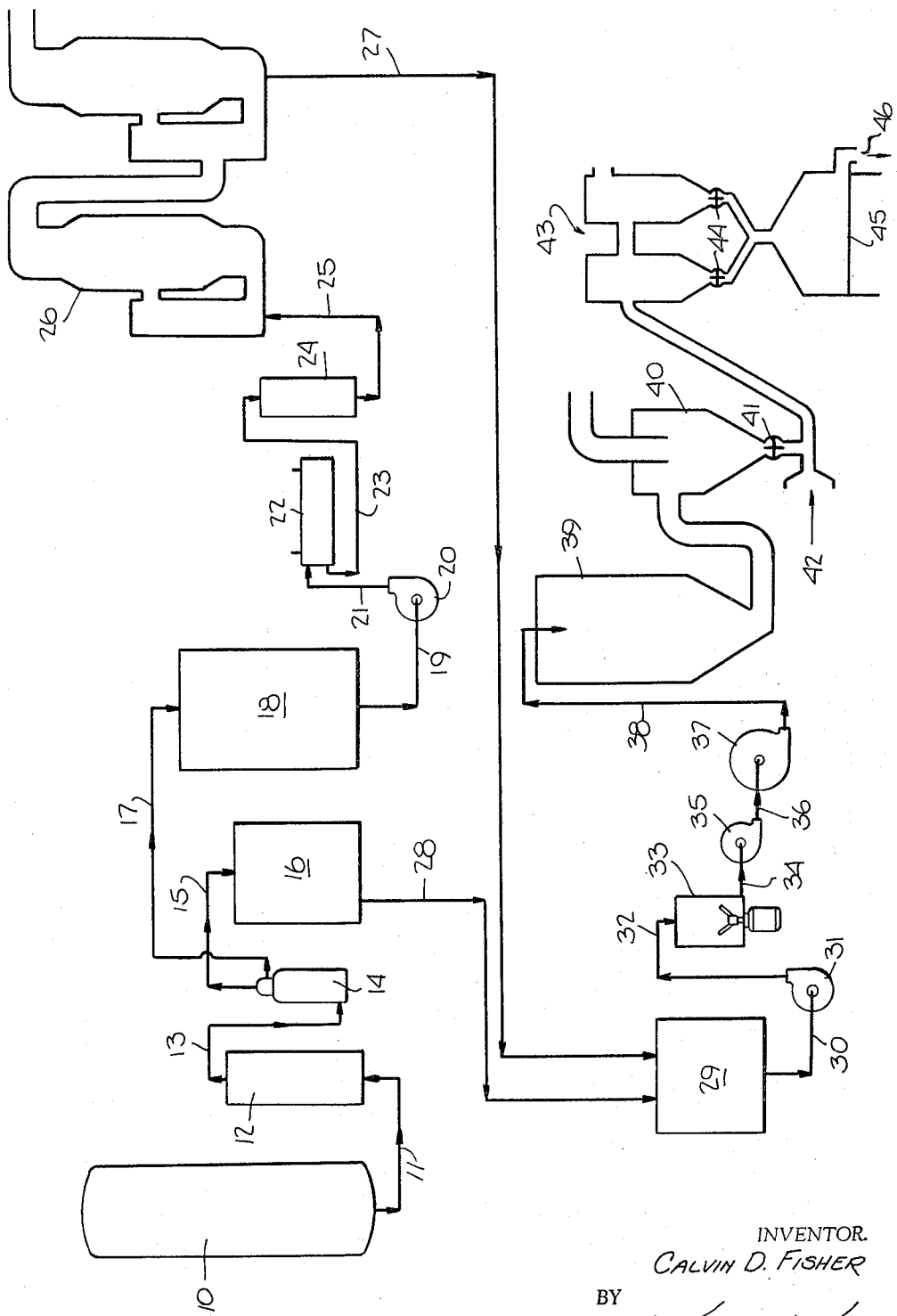
INVENTOR.
CALVIN D. FISHER
BY
Kenyon & Kenyon
ATTORNEYS United States Patent Office 3,357,840
Patented Dec. 12, 1967

3,357,840
DRY CONFECTION MIXES AND PROCESSES FOR PRODUCING SAME
Calvin D. Fisher, Ralston, Nebr., assignor to Roberts Dairy Company, Omaha, Nebr., a corporation of Nebraska
Filed Dec. 9, 1963, Ser. No. 329,028
11 Claims. (Cl. 99—136)

ABSTRACT OF THE DISCLOSURE

A process of producing a dry mix adapted to be frozen which comprises the steps of separating whole milk into a cream portion and skim milk portion wherein said cream portion contains about 35% to 45% butter fat; heating the skim milk portion separately for about 1–4 minutes at a temperature in the range of about 200–230° F., and condensing the heated skim milk portion to at least 35% total solids; combining the cream and condensed skim milk portions; adding thereto at least 30% of the sugar content to be employed in the total mix and the other ingredients to be used in the mix; heating all the ingredients to at least 152° F.; vigorously agitating the mix so as to incorporate air into the mix; spray drying the mix to form dry particles; and, rapidly cooling the dry particles. Pasteurization of the whole milk prior to separation may be accomplished in order to preserve one cream portion prior to combination. The products of the process provide confections.

This invention relates to dry confection mixes adapted to be mixed with water and frozen and to processes of producing same. More particularly this invention relates to dry ice cream and ice milk powders which when mixed with water and frozen, form a high quality ice cream or ice milk.

Dry confection products including ice cream and ice milk powders have been produced commercially for many years. It has generally been the practive when producing dry ice cream or ice milk mixes to condense and dry whole milk. To this whole milk powder is dry blended the sugar, stabilizer, flavoring, emulsifier, color and sufficient non-fat milk solids to adjust the desired final fat content. A typical dry ice cream mix formulation comprises no less than 27% fat; no less than 27.5% non-fat solids; no less than 39.5% sugar; no more than 1.0% stabilizer; with the balance comprising materials such as emulsifiers, coloring, flavoring, etc. Typically about 4.25 pounds of an ice cream mix of this composition is prepared for freezing by the addition of about 7.3 pounds of water. After mixing, the product is frozen until ready for use.

Products such as the above have found only limited acceptance in this country The quality of the frozen ice milk or ice cream product from the reliquefied powder has a coarse hard body and a scorched heat flavor. These body and flavor defects have kept these products from being acceptable to fresh ice cream or sherbet consumers. At present the only large outlets for dry mixes are the armed forces and undeveloped countries. The military has had to accept a coarse textured and scorched flavored product because it is the only product heretofore available using the present manufacturing and drying techniques.

It is therefore a primary object of this invention to provide a process of producing a dry ice cream or ice milk mix that will be acceptable to soft ice milk stands or hardened ice cream manufacturers.

It is another object of this invention to provide a process that will produce a dry ice milk or ice cream mix that will provide a homogeneous dried product which does not require homogenization when it is reconstituted with water.

It is a further object of this invention to provide a process that will produce dry ice cream or ice milk mixes that do not have scorched or highly cooked flavors when reconstituted with water.

It is still a further object of this invention to provide a process for producing a dry ice cream or ice milk mix which when mixed with water and frozen will provide a smooth, firm, frozen product.

It is still another object of this invention to provide dry ice cream or ice milk mixes which produce a smooth, firm, soft frozen or hardened product when rehydrated to the normal solids content of fresh mixes.

These and other objects of this invention will be apparent from the following detailed discription of this invention.

The dry ice cream or ice milk mixes of this invention are prepared by a process which comprises separating whole milk into a cream portion and a skim milk portion, separating the cream portion to about 35 to 45% butter fat, heating the skim milk portion separately for about 1–4 minutes at 200–230° F. followed by condensing the heated skim milk portion to about 35% total solids, combining the cream and and condensed milk portions together with at least 30% of the total sugar content of the final mix and the remainder of the ingredients to be employed in the mix, heating said mix to at least 152° F., subjecting said mix to vigorous agitation followed by spray drying said mix and then rapidly cooling it.

The term "confection mix" as used in this specification and claims will be understood to refer to both dry ice cream and ice milk mixes.

For a more detailed description of this invention, reference should now be had to the figure of the accompanying drawing which is a schematic diagram of the preferred process of this invention.

In this process, fresh raw milk is stored in storage tank 10 and is charged to a standard high temperature flash pasteurizing unit 12 through conduit 11. This pasteurization step protects the fat phase of the milk from bacteriological deterioration but does not alter its flavor. The pasteurized milk is then passed through conduit 13 into a standard De Laval separator unit 14 wherein the milk is separated into its cream and skim milk portions. In this unit the fat content of the cream is brought to and controlled at about 35–45% butter fat and is passed through conduit 15 to cream storage tank 16. The skim milk portion is passed through conduit 17 to skim milk storage tank 18 where it is stored until needed. The skim milk is withdrawn as required and passed through conduit 19, centrifugal pump 20, conduit 21 into a standard steam chest preheater 22. In this unit, the skim milk portion is preheated to a temperature in the range of about 200–230° F. and held at this temperature for about 1–4 minutes. This is an extremely important step in the process since this extreme heat treatment of the skim milk partially coagulates the milk protein and thus significantly increases the moisture binding capacity of the milk protein which subsequently thickens and smoothens the final reconstituted liquid mix. The preheated skim milk is then passed through conduit 23 into a standard positive flow holding tube 24 from which it is passed through conduit 25 into a standard double effect evaporator 26 wherein the preheated skim milk is condensed to about 35% total solids. The condensed preheated skim milk portion is then passed through conduit 27 into a standard mixing and heating tank 29 where it is mixed with measured portions of cream from cream storage tank 16 which are charged to said mixing and heating tank through conduit 28. The other ingredients to be employed in the dry mix such as sugar, stabilizer, corn syrup, non-fat milk solids, color, flavoring material, emulsifier and preservatives are then added to the tank. After mixing the cream and skim milk portions, I prefer to first add the dry stabilizer and emulsifier by slowly pouring them into the tank and subjecting this mixture to high speed agitation. This mixture is then rapidly heated to about 140° F. at which temperature the sugar and the other ingredients of the mix are added. The entire mixture is then heated to a temperature of at least 152° F. and held at this temperature for at least about 5 minutes. Shorter time periods may be used if higher temperatures are employed. For example, when temperatures on the order of about 185° F. are employed, the time is reduced to about 15 seconds. This heat treatment insures complete pasteurization of all mix ingredients. After the mix has been thus treated, it is passed through conduit 30, pump 31 and conduit 32 into a standard high speed whipping device 33 such as the Lanco Likwifier manufactured by the Creamery Package Manufacturing Co. of Canada, Ltd. This device is capable of increasing the volume of the product from about 10 to 500% by incorporating air or other inert food grade gases approved by the Food and Drug Administration into the mix. The amount of air incorporated is controlled by metering the flow of mix into the device. If more air is desired in the product in order to make a fluffy, flaky dried particle, the flow rate of mix to the device is reduced. If a denser particle is desired, the amount of air incorporated in the mix is reduced by increasing the flow rate of mix to the device. The mix is vigorously agitated in this apparatus for a period of time sufficient to produce a particle having the desired density. I have found that a time of about 3-4 minutes is generally sufficient for this purpose. This step in the process insures the free flowing characteristics of the finished powder. The whipped mix is then passed through conduit 34, variable speed positive pump 35, conduit 36, high pressure pump 37 and conduit 38 into spray drying chamber 39. High pressure pump 37 operates at about 4,500 pounds per square inch and atomizes the whipped mix as it is introduced into the spray drying chamber through an orifice in the chamber. The inlet and outlet temperatures on the spray drier are thermostatically controlled to maintain a moisture content of not more than 3.5% on the finished dry material. Generally the moisture content is maintained in the range of about 1-3.5%. The spray dried material is collected in a standard collecting cone 40 and the flow of the dried product from the collecting cone is controlled by a power driven star valve 41. As the dried product falls from the star valve, it is picked up by a refrigerated air stream introduced into orifice 42 and is conveyed by the stream into cooling and collecting cones 43. This step insures the rapid cooling of the spray dried material to a temperature of about 70-120° F. and is generally completed in about 3-10 seconds. The cooling of the product as it falls from the collecting cone 40 of the spray drier must be rapid and complete since the sugars in the mix (sucrose and milk sugars) are in a free flowing or liquid state as they fall from this cone. These sugars must be cooled correctly and rapidly in order to prevent their crystallizing into hydroscopic crystals which will cause the end product to be lumpy or caked. After the product has been collected, it is passed through valves 44 to a standard powder sifter 45 to remove any excessively large or burnt particles. The desired finished powder is collected at orifice 46 where it is packed into suitable containers such as polyethylene lined drums, bags or boxes. If desired, the product can also be vacuum packed under a reduced oxygen content if storage is expected to be a year or more.

In carrying out the above described process, up to 70% of the sugar or other dry sweetening agents may be withheld from the blend in the mixing tank 29 and dry blended with the finished dried product after it is cooled. It has been found that this procedure will produce a satisfactory mix and will at the same time increase the production capacity of any given unit.

The subjection of only the skim milk portion to the high temperatures and holding times in preheater 22 is believed to be responsible for partially stabilizing the product thus producing a smoother, more stable gel when the product is rehydrated. This same heat treatment could be applied to the condensed skim milk as it leaves evaporator 26 but this would produce a thick jelly-like mass that would be extremely difficult to handle. Another distinct advantage of preheating the skim milk portion only is that the high heat treatment on the cream portion or added sugars would have a deleterious effect on the flavor of the reconstituted liquid mix since this treatment on the milk fat would cause a cooked or scorched flavor to result and its effect on the added sugars would be to give the reconstituted mix an extreme caramelized flavor and also a slight brown discoloration.

The ice cream or ice milk mixes of this invention produced by the above process need only be rehydrated with cool potable water to the normal solids content of fresh mixes to produce a smooth, firm product when frozen in conventional batches or continuous freezers. Furthermore, these mixes do not require homogenization prior to freezing and are easily reconstituted with a minimum amount of agitation.

The sweentening agents employed may be those conventionally used in ice creams or sherbets such as cane or beet sugar, dextrose, glucose, corn syrup, corn sugar, or invert sugar. The stabilizers employed may be any stabilizer which has been approved by the Food and Drug Administration such as gelatin, sodium alginate, gum, tragacanth, Indian gum, karaya, Irish moss, locust bean gum, peptin, sodium carboxymethyl cellulose, etc. The stabilizers function through their ability to form gel structures in water solution or to combine with water as water of hydration. Consequently the stabilizers prevent the formation of coarse ice crystals and serve to impart smoothness and mouth-filling properties to the ice cream. I have found it particularly satisfactory to employ gelatin, sodium alginate and sodium carboxymethyl cellulose as the stabilizers.

Among the emulsifiers which may be employed in this invention are mono and di glycerides, lecithin, sorbitan, mono stearate, polyoxyalkalene derivatives of sorbitan, mono stearate and polyethyleneglycol ethers, etc. I prefer to employ mono and di glycerides as emulsifiers in the mixes of this invention. These emulsifiers serve to emulsify the fact in the ice cream mix more satisfactorily, giving a dry appearing ice cream of small air-cell structure, of improved whipping properties and of increased richness. Ice cream of superior body and texture is obtained when the fat globules in the mix are as finely and as widely dispersed as possible and it is the function of the emulsifiers to give the fat emulsion these properties.

The flavoring agents which may be employed in the mix of this invention are natural flavors such as vanilla, cocoa, chocolate, coconut, fruits, fruit extracts, nuts and spices. Artificial flavors such as vanilla compounds, artificial fruit flavors, imitation maple flavor, imitation nut flavors, etc. may also be used. Dyes certified for use in food products may be incorporated where desirable to contribute color to the mixes. I prefer to use a pure vegetable Annatto color in aqueous alkaline solution.

The dry ice cream mixes of this invention comprise about 10 to about 20% butter fat, about 10 to about 18% milk solids non-fat, about 10 to about 20% sugar, about 0.15 to about 0.5% stabilizer and about 0 to about 0.2% emulsifier. These mixes when reconstituted with water contain about 30 to about 59% total solids. Dry ice milk mixes of this invention comprise about 3.5 to about 7% butter fat, about 7.5 to about 18% milk solids non-fat, about 8 to about 20% sugar, about 0.15 to about 0.5% stabilizer and about 0 to about 0.2% emulsifier. These mixes when reconstituted with water contain about 19 to about 46% total solids. Ice milk mixes of this invention particularly adapted for use in milk shakes comprise about 2 to about 3.5% butter fat, about 9 to about 18% milk solids non-fat, about 8 to about 20% sugar, about 0.15% to about 0.5% stabilizer and about 0 to about 0.2% emulsifier. These mixes when reconstituted with water contain about 19 to about 42% total solids.

A typical ice cream mix of this invention is as follows:

| | Percent |
|---|---|
| Butter fat | 10.0 |
| Milk solids non-fat | 12.0 |
| Sugar | 15.0 |
| Stabilizer | .4 |

Sufficient emulsifier.
Sufficient flavoring agent.
Sufficient dyes.

A typical ice milk formulation of this invention is as follows:

| | Percent |
|---|---|
| Butter fat | 5.0 |
| Milk solids non-fat | 12.0 |
| Sugar | 13.0 |
| Stabilizer | .5 |

Sufficient emulsifier.
Sufficient flavoring agent.
Sufficient dyes.

A typical ice milk formulation particularly adapted for milk shakes is as follows:

| | Percent |
|---|---|
| Butter fat | 3.5 |
| Milk solids non-fat | 10.0 |
| Sugar | 11.0 |
| Stabilizer | .4 |

The above dry mixes are blended with water so that when reconstituted with water the typical ice cream formulations would have about 37.4% total solids and the ice milk formulations would have about 30.5% total solids and 24.9% total solids respectively.

Having thus provided a written description of the present invention and provided specific examples thereof, it should be understood that no undue restrictions or limitations are to be imposed by reason thereof but that the present invention is defined by the appended claims.

It is understood that the Abstract of Disclosure is included in this specification solely for the purposes of Rule 72(b) of The Rules Of Practice Of The United States Patent Office.

I claim:
1. A process for producing a dry mix comprising the steps of:
  (1) separating whole milk into a cream portion and skim milk portion wherein said cream portion contains about 35% to 45% butter fat;
  (2) treating said skim milk portion by process steps consisting essentially of:
     (a) heating the skim milk portion separately for about 1–4 minutes at a temperature in the range of about 200–230° F., and
     (b) condensing the heated skim milk portion to at least 35% total solids,
  (3) combining said cream and condensed skim milk portions;
  (4) adding thereto at least 30% of the sugar content to be employed in the total mix and the other ingredients to be used in the mix;
  (5) heating all the ingredients to at least 152° F.;
  (6) vigorously agitating the mix so as to incorporate air into said mix;
  (7) spray drying said mix to form dry particles; and,
  (8) rapidly cooling the dry particles.
2. The process of claim 1 including a step of pasteurizing said whole milke prior to said separation step.
3. The process of claim 2 wherein said dry particles have between 1 and 3.5% moisture and said particles are cooled to about 70–120° F.
4. The process of claim 3 wherein said combined portions are heated to at least 152° F. for at least 5 minutes and the volume of said agitated mix is increased by about 10–500%.
5. The process of claim 4 wherein all of the sugar is added to the mix at the time said other ingredients are incorporated in the mix.
6. A process for producing a dry mix comprising the steps of:
  (1) pasteurizing whole milk;
  (2) separating the pasteurized milk into a cream portion and a skim milk portion wherein said cream portion contains about 35–45% butter fat;
  (3) treating said skim milk portion by process steps consisting essentially of:
     (a) heating the skim milk portion separately for about 1–4 minutes at about 200–230° F., and
     (b) condensing the heated skim milk portion to about 35% solids,
  (4) combining said cream and condensed skim milk portions;
  (5) heating said admixture to about 140° F. at which temperature at least 30% of the sugar and other ingredients to be employed in the mix are added;
  (6) heating all the ingredients to at least 152° F. for at least 5 minutes;
  (7) vigorously whipping said mix for at least 3–4 minutes so as to incorporate air into said mix and to increase the volume of the mix about 10–500%;
  (8) spray drying said mix so as to obtain a finished dry material having a moisture content of between about 1–3.5%; and,
  (9) rapidly cooling the spray dried material to about 70–120° F. in about 3–10 seconds.
7. A frozen confection product prepared according to the process of claim 6, comprising about 2 to about 20% butter fat, about 7.5 to about 18% skim milk solids non-fat, about 8 to about 20% sugar, about 0.15 to about 0.5% stabilizer and up to 0.2% emulsifier, the balance of said product being water.
8. The process for producing a frozen confection comprising the process of claim 4 and including, subsequent to said cooling step, the steps of adding water to said dry mix, and freezing the resulting mix to form a frozen confection product.
9. A dry ice cream mix prepared according to the process of claim 4 wherein the proportions of said ingredients are based on a water mixture of said dry mix, said ingredients when in said water mix comprising about 10 to about 20% butter-fat, about 10 to about 18% skim milk solids non-fat, about 10 to about 20% sugar, about 0.15 to about 0.5% stabilizer and up to 0.2% emulsifier.
10. A dry ice milk mix prepared according to the process of claim 4 wherein the proportions of said in- gredients are based on a water mixture of said dry mix, said ingredients when in said water mix comprising about 3.5 to about 7% butter-fat, about 7.5 to about 18% milk solids non-fat, about 8 to about 20% sugar, about 0.15 to about 0.5% stabilizer and up to 0.2% emulsifier.

11. A dry ice milk shake prepared according to the process of claim 4 wherein the proportions of said ingredients are based on a water mixture of said dry mix, said ingredients when in said dry mix comprise about 2 to about 3.5% butter-fat, about 9 to about 18% milk solids non-fat, about 8 to about 20% sugar, about 0.15 to about 0.5% stabilizer and up to about 0.2% emulsifier.

References Cited

UNITED STATES PATENTS

| | | | |
|---|---|---|---|
| 1,424,602 | 8/1922 | Turney | 99—136 |
| 1,440,011 | 12/1922 | Hasman | 99—136 |
| 1,659,723 | 2/1928 | Cosler | 99—136 |

OTHER REFERENCES

Turnbow et al., Ice Cream Industry, John Wiley & Sons, New York, 1947, 2nd edition, p. 42.

A. LOUIS MONACELL, *Primary Examiner.*

J. M. HUNTER, *Assistant Examiner.*